United States Patent
Bolosky et al.

(10) Patent No.: US 7,600,126 B2
(45) Date of Patent: Oct. 6, 2009

(54) EFFICIENT PROCESSING OF TIME-BOUNDED MESSAGES

(75) Inventors: William J. Bolosky, Issaquah, WA (US);
Atul Adya, Redmond, WA (US); Ronnie I Chaiken, Woodinville, WA (US);
Marcus Jon Jager, Boulder Creek, CA (US)

(73) Assignee: Microsoft Corporation, Redmond, WA (US)

( * ) Notice: Subject to any disclaimer, the term of this patent is extended or adjusted under 35 U.S.C. 154(b) by 55 days.

(21) Appl. No.: 11/139,705

(22) Filed: May 27, 2005

(65) Prior Publication Data
US 2006/0271784 A1    Nov. 30, 2006

(51) Int. Cl.
*H04L 9/32* (2006.01)

(52) U.S. Cl. .................. 713/181; 713/170; 707/1; 707/10; 726/1; 726/22; 709/207

(58) Field of Classification Search .............. 707/1, 707/10; 709/206, 207; 713/170, 181; 726/1, 726/22
See application file for complete search history.

(56) References Cited
U.S. PATENT DOCUMENTS

2003/0009698 A1* 1/2003 Lindeman et al. ........... 713/201
2003/0220903 A1* 11/2003 Mont et al. ................... 707/1

OTHER PUBLICATIONS

Birrell, et al.; "Grapevine: An Exercise in Distributed Computing"; Communications of the ACM; Apr. 1982, vol. 25, No. 4; pp. 260-274.
Saito et al.; "The Porcupine Scalable Mail Server"; Department of Computer Science and Engineering of Unitersity of WA; Published in 1999; pp. 48-52.

* cited by examiner

*Primary Examiner*—Thanhnga B Truong
(74) *Attorney, Agent, or Firm*—Lee & Hayes, PLLC

(57) ABSTRACT

Efficient processing of time-bound messages is described herein. In an implementation, messages are classified either time-bounded messages or non-time-bounded messages. The time-bounded messages are then processed separately from the non-time-bound messages. Examples of time-bounded messages can include spam e-mails or other types or classes of e-mails subject to a retention policy, such that the are retained only for some set period of time. Metadata relating to the time-bound messages are compiled and stored separately from the messages, thereby enabling optimization of the metadata storage and processing apart from the messages. The time-bounded messages are accumulated before they are processed in bulk, thereby reducing the number if I/O operations consumed by the time-bound messages, and reducing the amount and cost of resources supporting the process of the time-bounded messages.

19 Claims, 14 Drawing Sheets

EFFICIENT PROCESSING OF TIME-BOUNDED MESSAGES

TECHNICAL FIELD

This invention relates to efficient processing of time-bounded messages.

BACKGROUND

Spam constitutes a large fraction of the messages that reach and are processed by e-mail services, corporate enterprises, and Internet Service Providers (ISPs). Because of the prevalence of spam, significant portion of the bandwidth and hardware resources of the e-mail services and ISPs are committed to handling and processing spam. At the same time, because spam typically has different properties and is handled differently than ordinary mail, there is an opportunity to optimize the performance of the e-mail servers and other hardware by capitalizing on these particular properties and handling characteristics. More particularly, spam messages tend to be smaller than ordinary mail messages, they are less likely to be read, they tend to be less important or valued by end-users and thus deleted in bulk, and they are typically automatically deleted after a certain period of time (e.g., several days).

In a similar context, corporate enterprises may face similar issues in managing and storing message traffic, such as e-mails. More particularly, such enterprises may be affected not only by spam, but also by a high volume of non-spam messages flowing to and from the persons working within the enterprise. To reduce the volume of such messages that are stored by e-mail servers within the enterprise, administrators may establish policies that mandate that certain classes of messages be deleted automatically after a given period of time. For example, some types or classes of messages may be deleted automatically thirty days after they have been sent or received, regardless of whether they are considered "spam". In this sense, such classes of non-spam messages may share some characteristics with spam, in that both are retained for defined periods of time and are deleted automatically after expiration of this period of time.

Processing, managing, and deleting a significant number of messages typically entails the message server performing a significant number of input/output (I/O) operations. Such operations are known to involve substantial overhead in preparing hardware, for example disk drives, to actually move the data that may be considered the "payload" of the I/O operations. However, if the processing of such messages is optimized, then the hardware resources committed to supporting such processing may be reduced or consolidated, thereby reducing the overall operational cost borne by ISPs, e-mail service providers, corporate enterprises, or the like. The teachings herein address this and other needs in the art.

SUMMARY

Efficient processing of time-bounded messages is described herein.

In an implementation, messages are classified as either time-bounded messages or non-time-bounded messages. The time-bounded messages are then processed separately from the non-time-bounded messages. Examples of time-bounded messages can include spam e-mails or other types or classes of e-mails subject to a retention policy, such that they are retained only for some set period of time. Metadata relating to the time-bounded messages are compiled and stored separately from the messages, thereby enabling optimization of the metadata storage and processing apart from the messages. The time-bounded messages are accumulated before they are processed in bulk, thereby reducing the number if I/O operations consumed by the time-bounded messages, and reducing the amount and cost of resources supporting the processing of the time-bounded messages.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
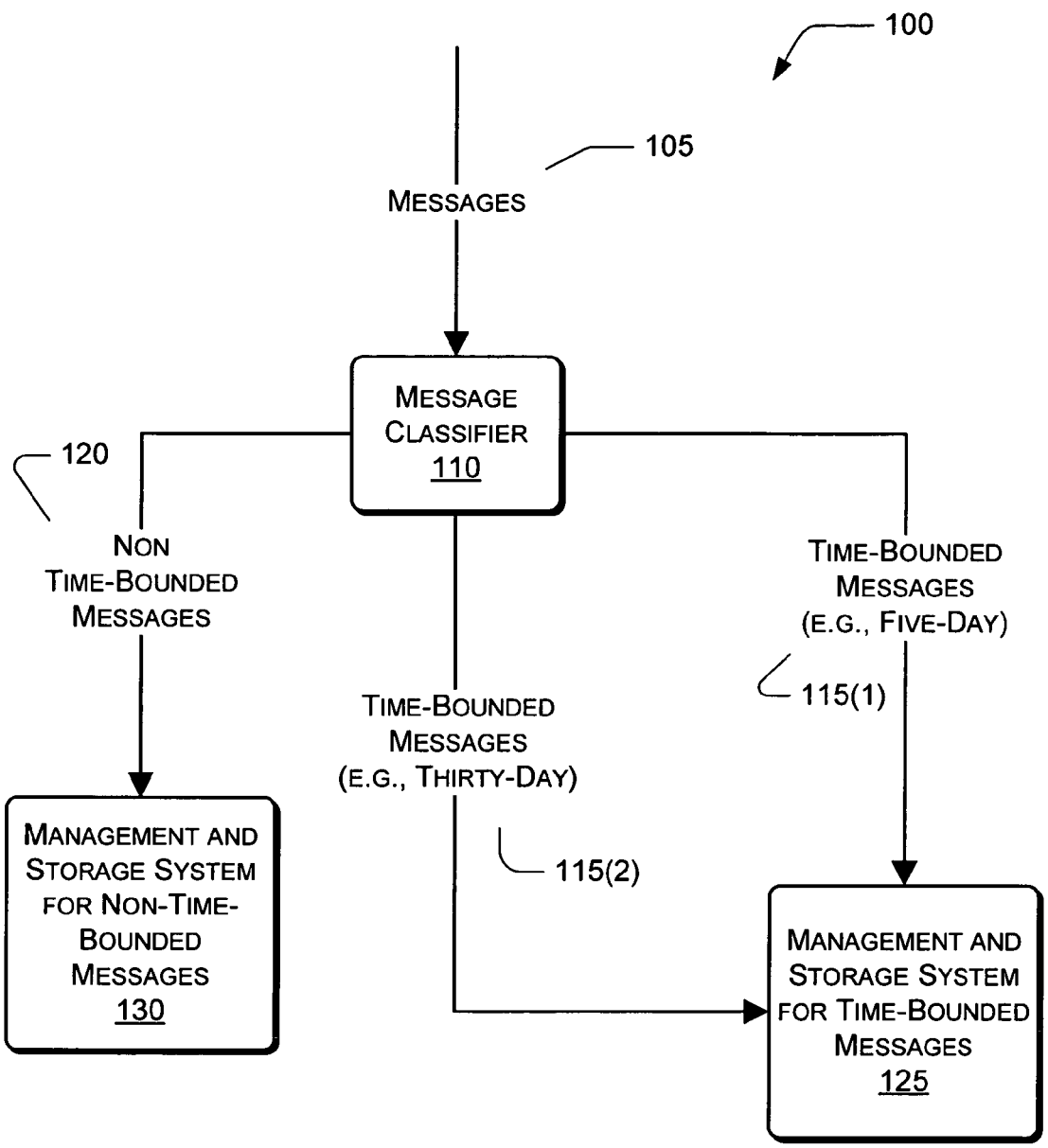
FIG. 1 is a block diagram illustrating a high-level data flow for the efficient processing of time-bounded messages.

FIG. 1 illustrates a high-level data flow 100 provided by the teachings herein. Messages 105 are received by a message classifier 110. The message classifier 110 divides these messages 105 into at least two categories, with a first category including messages 115 that are time-bounded and at least a second category including messages 120 that are not time-bounded. Time-bounded messages 115 include those messages that are subject to some rule specifying how long they are retained. Different ones of the messages 115 might be subject to one or more different retention periods. FIG. 1 shows two sample sets of messages 115, with a first set of messages 115(1) being subject to a five-day retention period, and a second set of messages 115(2) being subject to a thirty-day retention period. While two sets of message 115 are shown in FIG. 1 for clarity and convenience, any number of different retention periods could apply to different sets of time-bounded messages 115.

The messages 115 are routed to a management and storage system 125 for the time-bounded messages 115, which system 125 is described in detail herein. For clarity and convenience, the two sets of messages 115(1) and 115(2) are shown routed to an instance of the management and storage system 125. However, it is noted that a respective instance of the management and storage system 125 could be implemented for each different set of messages 115 that is subject to a different retention period.

Non-time-bounded messages 120 include those messages 120 that are not subject to any rule specifying how long they are retained, and are thus retained indefinitely. These messages 120 can be routed to a conventional management and storage system 130 for the non-time-bounded messages 120.

The data flow 100 shown in FIG. 1 may be deployed in a variety of environments. As a first example, the data flow 100 may be deployed in the context of an ISP that provides e-mail services to a plurality of subscribers. In this first example, the messages 105 can take the form of e-mails incoming to the subscribers, and the message classifier 110 can take the form of a spam filter. The time-bounded messages 115 can take the form of e-mails identified by the message classifier 110 as spam. This ISP may implement a policy that specifies how long messages 105 classified as spam are retained. For convenience in discussion, but not limitation, this duration of time is referred to herein as a "retention period". For example, messages 105 classified as spam may be subject to a retention period of five days. In this example, messages 105 that are classified as spam are routed to the management and storage system 125, which manages and deletes the spam after expiration of the retention period, as described in further detail below.

As a second example, the data flow 100 may be deployed in the context of an e-mail application that serves, for example, a given corporate enterprise. Such enterprises may implement polices specifying retention periods for certain classes of e-mails received by or sent from the enterprise. For example, but not limitation, a given enterprise may specify a retention period of thirty days for messages 105 in the form of "sent" e-mails. In this example, the message classifier 110 would identify these "sent" e-mails, and route them to the management and storage system 125 for disposition in pursuant to this policy.

Figure 2:
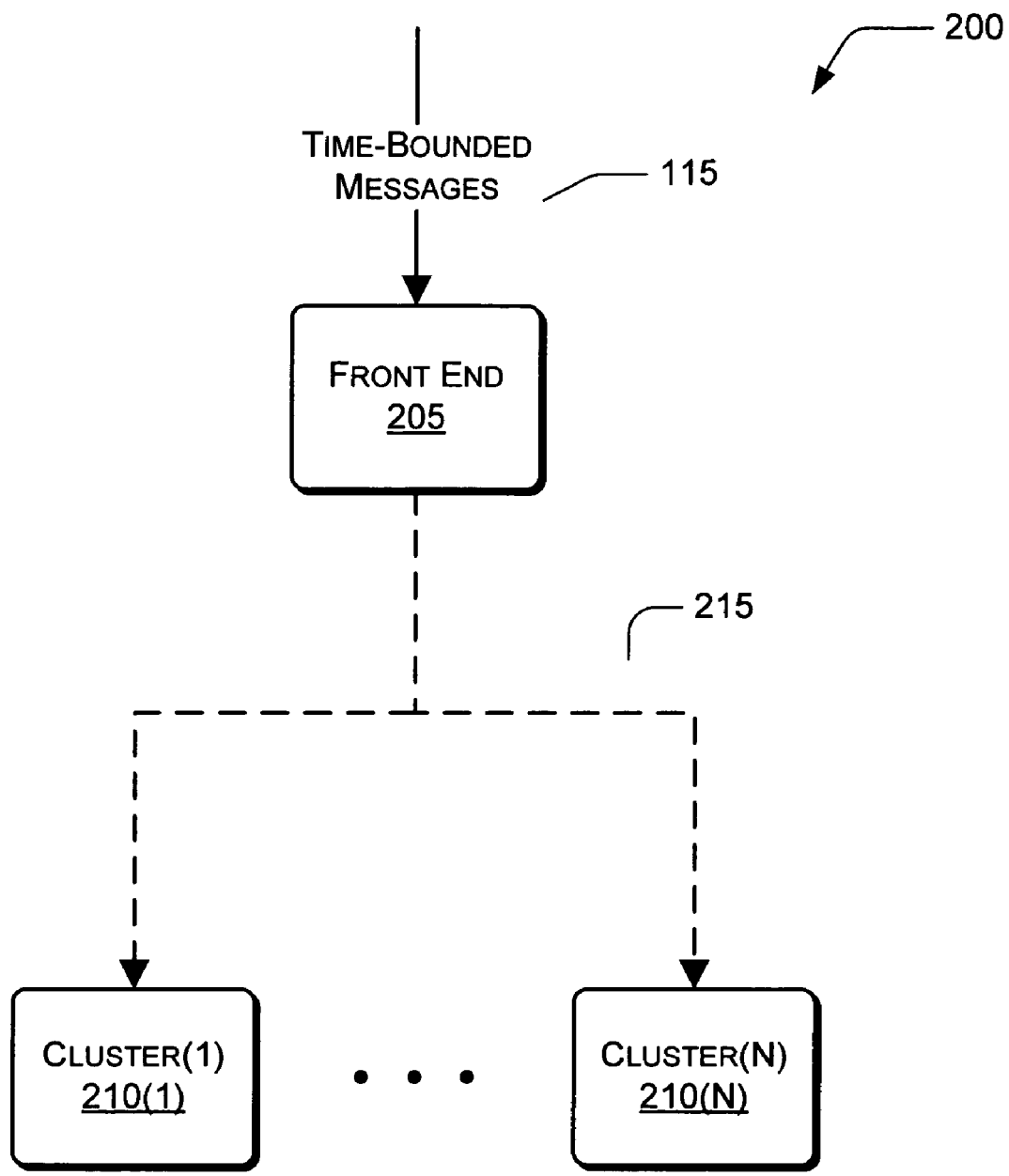
FIG. 2 is a block diagram illustrating components and data flows associated with a management and storage system as shown in FIG. 1 for processing time-bounded messages.

FIG. 2 illustrates components and data flows associated with the management and storage system 125 shown in FIG. 1 for handling time-bounded messages 115. The management and storage system 125 includes a front end 205 that receives the time-bounded messages 115, and further includes a plurality of clusters 210(1) and 210(N) (collectively, cluster 210) communicating with the front end 205. The front end 205 load-balances among the various clusters 210, and routes given ones of the time-bounded messages 115 to ones of the clusters 210, as represented by the dashed lines 215.

While N clusters 210 are shown in FIG. 2, this configuration, and other configurations illustrated herein, is chosen for convenience and conciseness only, and does not limit the teachings herein. Instead, the teachings herein can be implemented with any number of clusters 210, with N being an integer chosen greater than zero, such that the total number of clusters is N. This general description applies to any component illustrated herein in connection with the integer N.

Figure 3:
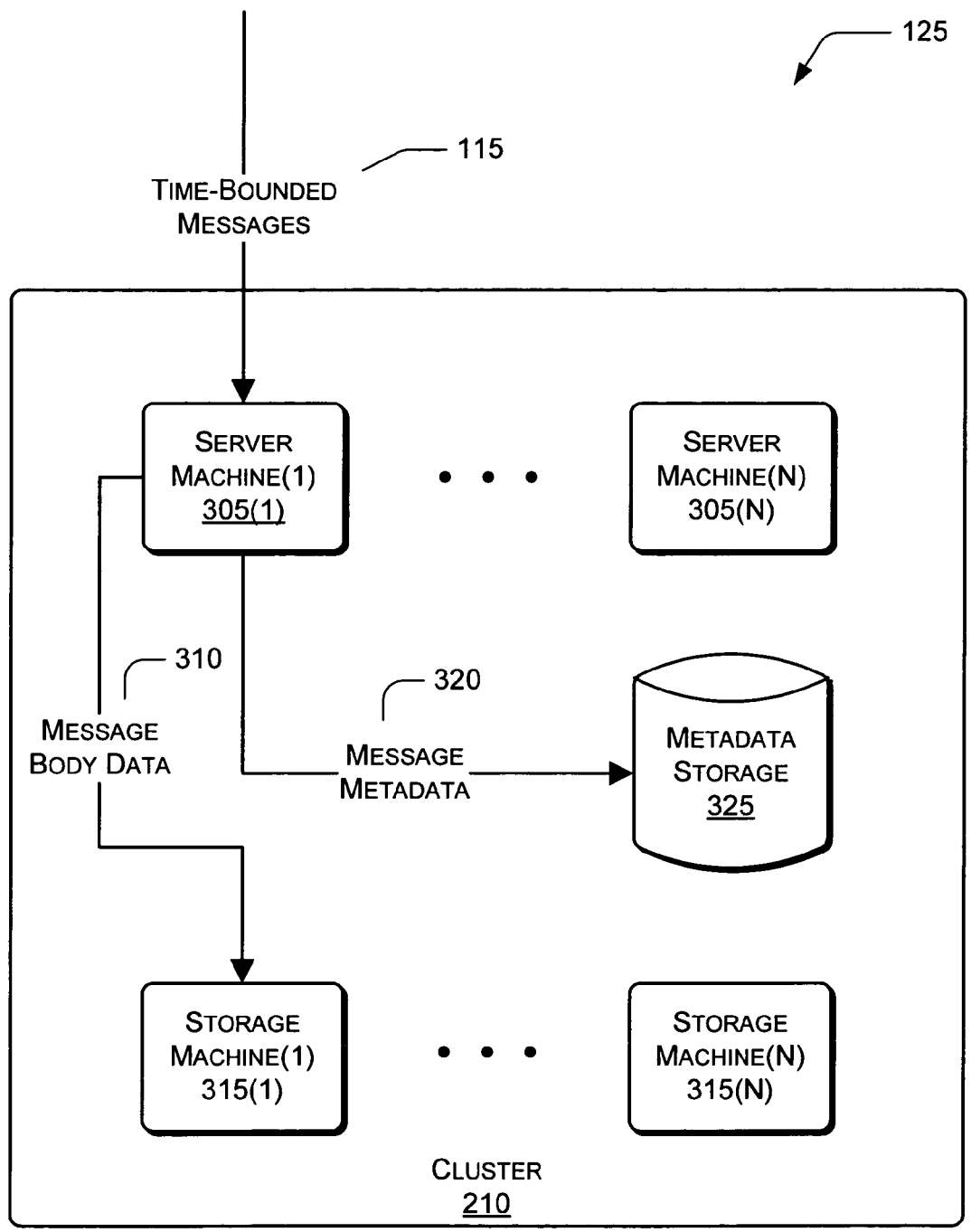
FIG. 3 is a block diagram illustrating in further detail the components and data flows associated with the management and storage system shown in FIGS. 1 and 2, particularly the components of a given cluster.

FIG. 3 illustrates is further detail the components and data flows associated with the management and storage system 125 shown in FIGS. 1 and 2, particularly the components of the clusters 210. A given cluster 210 can include a plurality of server machines 305(1) and 305(N) (collectively, server machine 305), on which the software running the cluster 210 executes. A suitable example of a server machine 305 is a pico Server ("PServ") webserver configured to support the functions taught herein.

The front end 205 selects a given cluster 210 to receive a given time-bounded message 115. A given server machine 305 within the selected cluster 210 forwards a body 310 of the given time-bounded message 115 to one or more machines 315 for storage, as discussed in further detail in connection with FIG. 4 below. The server machines 305 also populate header structures with metadata 320 related to the time-bounded messages 115, and route this metadata 320 to metadata storage structure 325, all of which is discussed in more detail below in connection with FIG. 5.

The server machines 305 can write the message bodies 310 and the metadata 320 to separate storage structures, thereby causing the message bodies 310 and the metadata 320 to be stored separately from one another. The message bodies 310 as a whole are considered to include any header data related to the messages, but the header structures themselves, which contain the metadata 320 can be stored separately from the message bodies 310. Separately storing the message bodies 310 apart from the metadata 320 can enable the management and storage system 125 to optimize the processing of the message bodies 310 and the metadata 320 independently from one another. The term "processing" as used herein can include at least receiving, handling, storing, or retrieving messages, or deleting messages after expiration of any applicable retention period.

FIG. 3 illustrates N server machines 305 (severally, server machines 305(1) and 305(N)) and N storage machines 315 (severally, storage machines 315(1) and 315(N)) for convenience and conciseness only. However, it is noted that this illustration does not limit the teachings herein. Instead, the teachings herein can be implemented with any number of server machines 305 and storage machines 315. More particularly, a single box can run or host the server machine 305, the storage machine 315, and the metadata storage 325. Alternatively, some or all of the foregoing machines can be implemented on other boxes.

Figure 4:
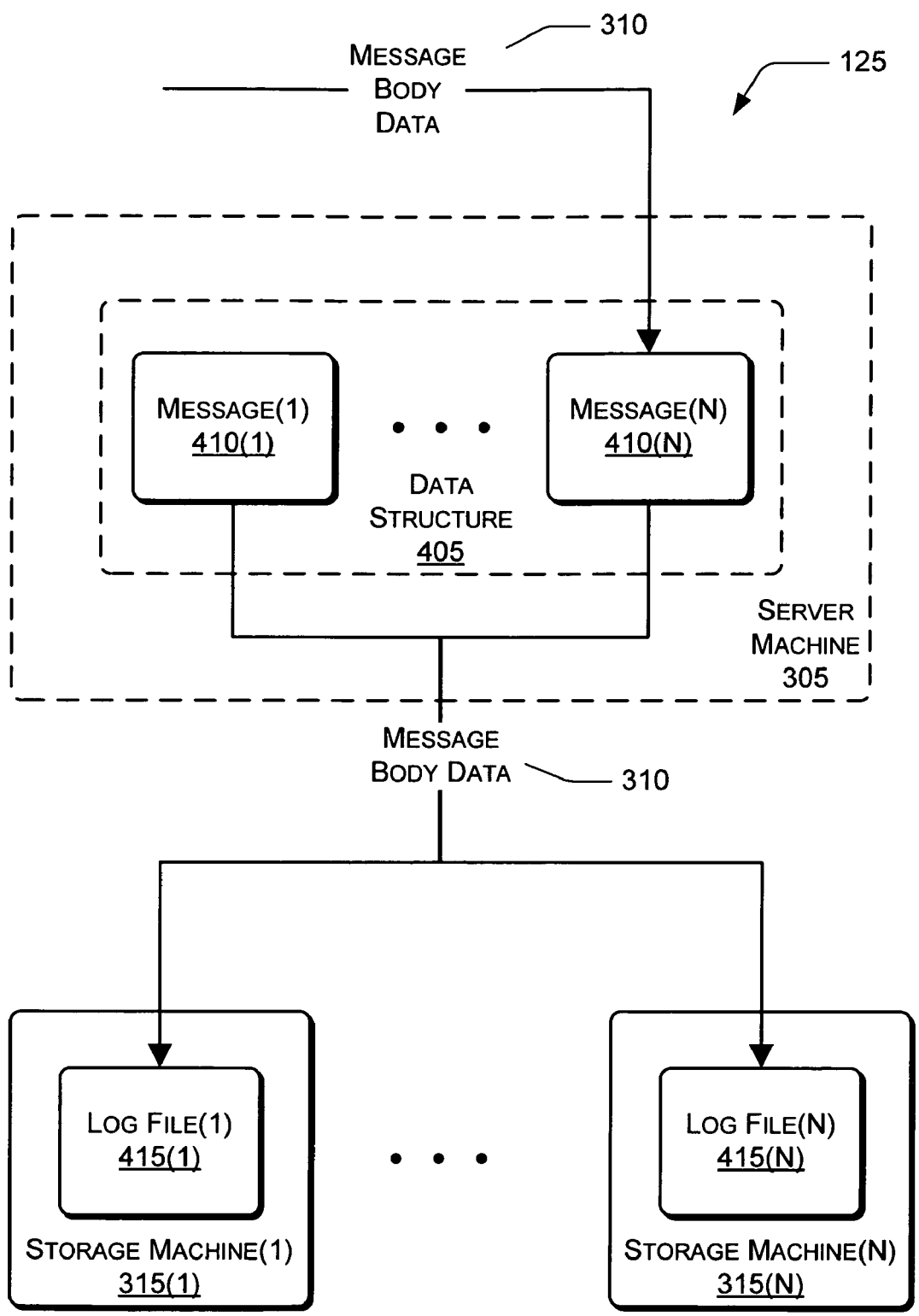
FIG. 4 is a block diagram illustrating in more detail components and data flows associated with processing and storing the bodies of the time-bounded messages shown above in FIG. 3.

FIG. 4 illustrates in more detail components and data flows associated with processing and storing the bodies 310 of time-bounded messages 115, as shown in FIG. 3. As discussed in FIG. 3 above, the message bodies 310 and metadata 320 are separated, and handled and stored in separate structures. FIG. 4 addresses the management of the message bodies 310, while FIG. 5 addresses the management of the metadata 320.

Each server machine 305 maintains a data structure 405 into which message bodies 310 are stored as they arrive. This data structure 405 can reside in the memory of the server machine 305. The exact nature of the data structure 405 is not critical, and can assume the form of, for example, a queue, a linked list, a stack, an array, or the like. The data structure 405 includes respective fields 410(1) and 410(N) (collectively, fields 410) for respective message bodies 310, and for convenience only, a given message body 310 is shown being loaded into the field 410(N). Assuming that the data structure 405 is implemented as a queue, the given message body 310 can be appended to the queue.

The data structure 405 serves to accumulate a plurality of respective message bodies 310. When the data structure 405 becomes sufficiently large (e.g., on the order of a megabyte) or after expiration of a given interval of time (e.g., approximately every 100 milliseconds), the message bodies 310 in the data structure 405 are written to one or more log files 415(1) and 415(N) (collectively, log files 415 or log file sets 415) hosted on respective storage machines 315. The term "set", as used herein, refers to a quantity of one or more. The storage machines 315 can host the log files 415 using disk-drive media and related storage technology. Given message bodies 310 can be written to log file sets 415 for redundancy and fault tolerance, if appropriate in a given implementation. According to some aspects of the teachings herein, the log files 415 can be implemented, at least in part, using one or more databases. In such implementations, the log files 415 can be written to a set of tables in a batch. It is understood that these aspects of the teachings herein are illustrative and non-limiting in nature.

The server machines 305 can select log file sets 415 on storage machines 315 using a modified round-robin algorithm, which can be biased in order to load-balance among the storage machines 315. For example, when a given storage machine 315 approaches its storage capacity, the server machine 305 can reduce the rate of new message bodies 310 being written to that storage machine 315. In illustrative embodiments of the teachings herein, a given log file 415 can be written by only one server machine 305, thereby eliminating any need to coordinate writes to the given log file 415 by different server machines 305. Log file sets 415 can be closed when there is a write error to either part of the set 415, or when the log files 415 have been open for a given period (e.g., a few hours), as discussed further below in connection with FIG. 6.

The log files 415 can be written using an option that forces the write directly through to the disk media, as opposed to writing to a cache, buffer, or other form of intermediate data structure, and the write operation can be considered incomplete until the write becomes persistent. When the write to the storage machine 315 completes, the server machine 305 knows the name of the log file 415 storing a given message body 310, the storage machine 315 containing the log file 415, the offset of the given message body 310 within its log file 415, and the length of the message body 310. The server machine 305 can store these parameters for each message body 310 as metadata 320 in the metadata storage structure 325.

By accumulating a plurality of message bodies 310 in the data structure 405 before writing them to the log files 415, as opposed to writing each message body 310 piecemeal to the log file 415, the management and storage system 125 achieves greater efficiency. Assuming that the storage machines 315 include a secondary storage device such as a disk drive, and that reads-from or writes-to such a drive are referred to as "I/O operations", each I/O operation involves a significant amount of overhead to locate the appropriate sector in the storage media before any data "payload" can be read-from or written-to the storage media. More particularly, this overhead includes the time that the drive takes to seek the appropriate track on the drive, the time to move the read-write head radially to this track, and the time to spin the drive as appropriate to place the targeted sector under the read-write head. Typically, this overheard time substantially exceeds the time to transfer data to or from the storage media, unless the payload is large. For example, by contemporary standards, this trade-off point may be close to a megabyte of payload. However, as technology evolves, this trade-off point may change.

Writing the message bodies 310 on an individual or piecemeal basis to the storage machines 315 would be inefficient, because the actual time spent on writing the message bodies 310 themselves would be small relative to the above overhead. Also, this overhead would be repeated for each message body 310 received by the management and storage system 125, such that storing X message bodies 310 would result in X repetitions of the overhead. Instead, the management and storage system 125 accumulates a plurality of message bodies 310 in the data structure 405, and then writes these accumulated message bodies 310 in bulk to the storage machines 315. Because these message bodies 310 are written in bulk, the above overhead consumes a smaller proportion of the overall I/O operation of writing the message bodies 310 to the storage machines 315. Also, X message bodies 310 can be stored with only one instance of the above overhead. Both of these factors increase the overall efficiency of the I/O operations performed by the management and storage system 125.

Because each of the I/O operations move more "payload" and are therefore more efficient, the systems and methods constructed as taught herein can support the message processing load of conventional systems with fewer I/O operations. Therefore, fewer machines are involved in servicing this load, which means less investment in obtaining and maintaining the machines. Alternatively, if a conventional system that has a given set of resources is adapted as taught herein, it may be able to handle a higher message load.

Figure 5:
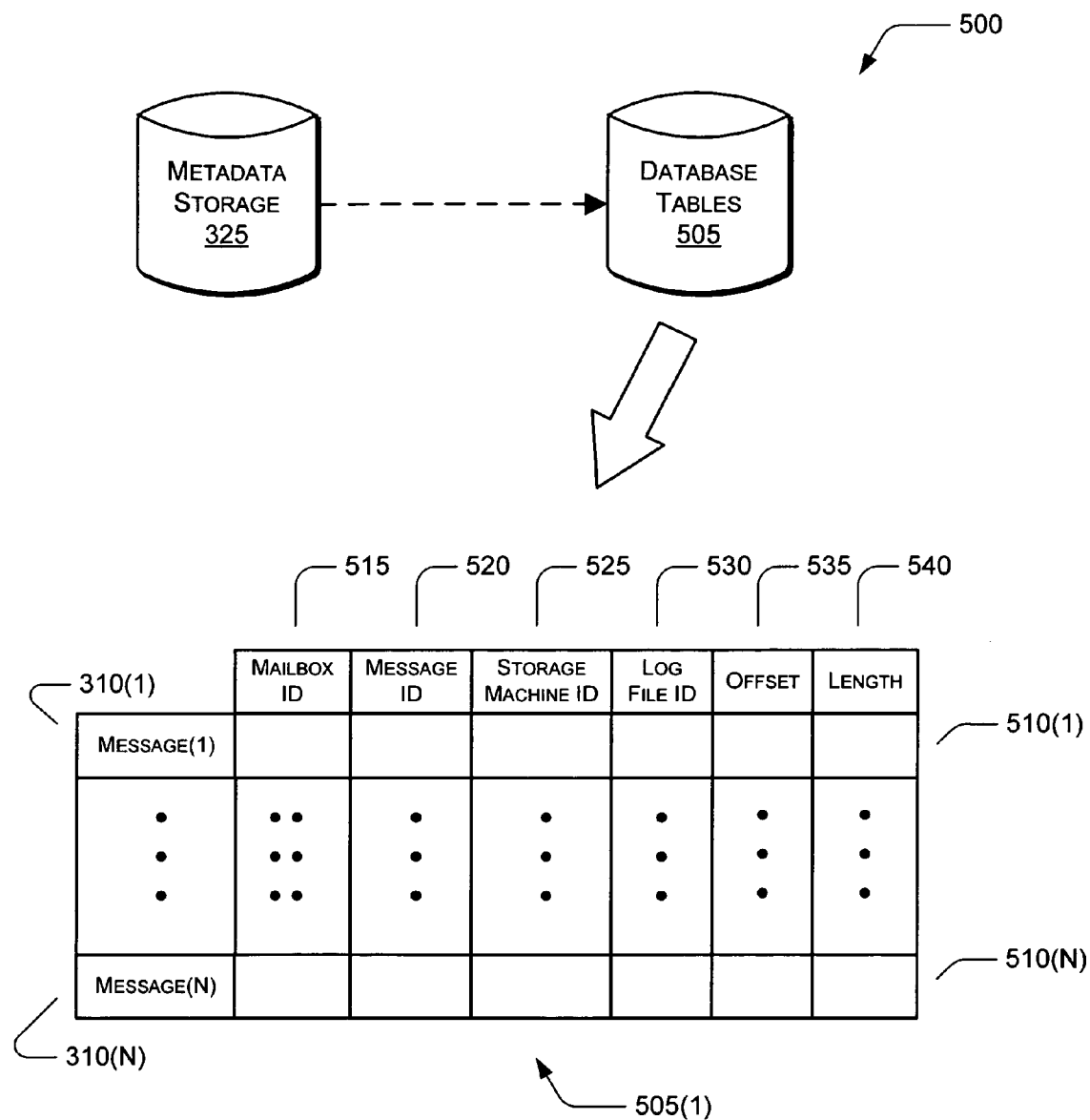
FIG. 5 is a block diagram illustrating one implementation of a metadata storage structure as shown above in FIG. 3.

FIG. 5 illustrates an implementation 500 of the metadata storage structure 325 shown in FIG. 3. Another embodiment of the metadata storage structure 325 is shown and discussed below in connection with FIG. 6.

While the log files 415 discussed above can efficiently collect and store the message bodies 310 in bulk, when a user wishes to list or view the contents of his or her mailbox, it may be more efficient to maintain a second structure 315 to store the metadata 320 separate from the log files 415. This metadata 320 can include the information that enables a suitable e-mail application to display the headers of messages.

The metadata 320 can include data that is relatively visible to the end-user and other data that is not as visible to the end user. Visible metadata 320 can include data representing destination and/or originating addresses of messages, time or date stamps representing transmit or receive times, subject lines, icons indicating whether messages have been read, or the like. Less visible metadata 320 can include information involved in locating a given message body 310, and can include the name of the log file 415 containing the given message body 310, the storage machine 315 containing the log file 415, the offset of the message body 310 within the log file 415, and the length of the message body 310.

The metadata storage structure 325 can be implemented at least as the embodiment 500 shown in FIG. 5. In this embodiment 500, the metadata storage can be implemented as a set of database tables 505 (e.g., SQL-based tables), and in a second embodiment shown in FIG. 6, as an image-based log. In both embodiments, the metadata 320 for a given mailbox can be stored on a given storage machine 315. Further, the metadata 320 can be updated by running transactions from the server machine 305 that receives the update request. In the table-based implementations, each update involves only one transaction, with the updates being appended to the appropriate table. Some image-based implementations may execute separate read and write transactions to perform this update. However, other image-based implementations may avoid the read transaction by rounding up writes to sector boundaries or by storing the tail ends of sectors in memory.

In contrast, conventional solutions may need two transactions per update to account for partial writes into the message log files. A first transaction reads the partial message log file writes, and a second transaction writes the updates.

Figure 6:
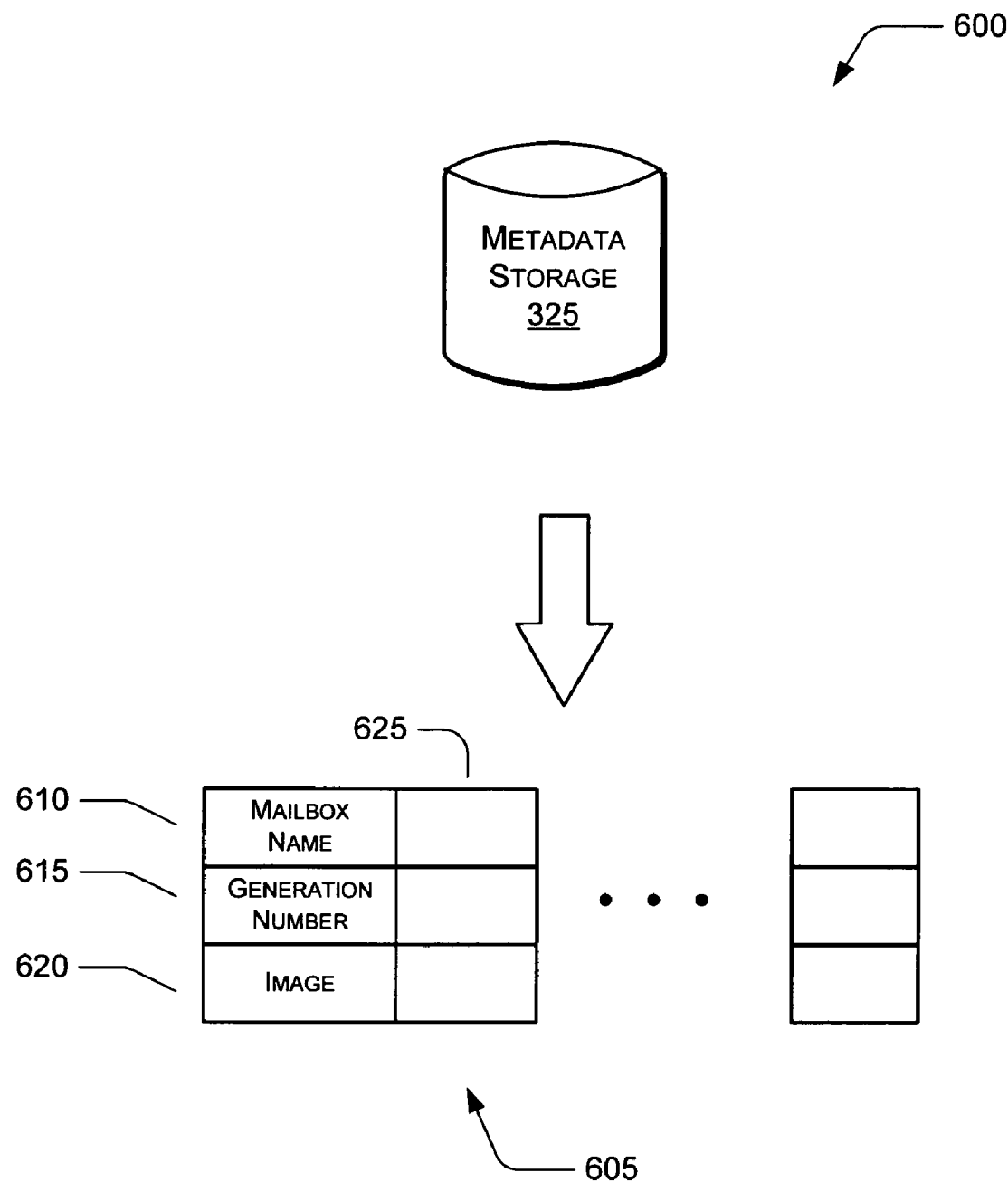
FIG. 6 is a block diagram illustrating another implementation of the metadata storage structure.

The embodiments shown in FIGS. 5 and 6 may allow metadata 320 to exist beyond the retention period. This is, some metadata 320 may describe message bodies 310 and/or log files 415 that have expired and/or been deleted. Because the metadata 320 is stored and managed apart from the message bodies 310, separate maintenance and deletion algorithms may be defined and optimized for the metadata 320 and the message bodies 310. When it is most efficient to delete a given set of message bodies 310 and/or log files 415, it may not be most efficient to delete the corresponding metadata 320. However, as discussed in detail below, the server machines 305 ignore this "expired" metadata 320 when traversing the metadata storage structure 325. In the embodiment featuring an implementation of the metadata storage as an SQL table 505, the server machines 305 can write queries designed not to return metadata 320 for deleted/expired log files 415 and/or message bodies 310.

In the database table embodiment 500, the metadata 320 can be stored in a set of tables 505. One row 510(1) in a representative table 505(1) can correspond to each message body 310 stored by the management and storage system 125. As new message bodies 310 are stored or deleted, additional rows 510(N) can be created, or existing rows 510(N) can be deleted or emptied.

The tables 505 can be configured to be generational in nature. That is, a given table 505 can store metadata 320 for all of the message bodies 310 for a given period of time, for example, about half of the retention period. The table 505 can be indexed by mailbox ID 515 and message ID 520, and columns of the table 505 can correspond to the various types of metadata 320 discussed above. For each given message body 310, a column 525 can store an ID of the storage machine 315 containing the log file 415 that stores the message body 310, a column 530 can store an ID of the log file 415 within the storage machine 315, a column 535 can store the offset of the message body 310 within the log file 415, and a column 540 can store the length of the message body 310. A separate table can track the locations of any tables or other structures replicating the foregoing.

FIG. 6 illustrates an additional implementation 600 of the metadata storage structure 325. The embodiment 600 can include a table 605 with three rows: a row 610 for the name of a given mailbox, a row 615 containing a generation number (typically an integer), and a row 620 for an image of the given mailbox. Respective columns 625 can be instantiated for each mailbox.

The image 620 is referred to herein as a log "blob". The term "blob" is known in the industry as shorthand for a "binary large object". Thus, rather than defining a table 505 with one row 515 per message body 310, the embodiment 600 can include an image or log blob 620 for each non-empty mailbox.

The log blob 620 can contain metadata 320 similar to the metadata 320 contained in the table 505 described above. When a server machine 305 updates the metadata 320 for a given mailbox, it can retrieve the log blob 620 and generation number 615 for that mailbox from the metadata storage structure 325. The server machine 305 can then update the log blob 620 with the new metadata 320, increment the generation number 615, and write the updated log blob 620 and incremented generation number 615 back to the metadata storage structure 325.

Before writing the updated log blob 620 and generation number 615 back to the metadata storage structure 325, the server machine 305 checks whether the generation number 615 of the log blob 565 as currently stored in the metadata storage structure 325 has changed since the server machine 305 originally read the log blob 620. If the generation number 615 has changed since the original read, this may indicate that another server machine 305 or other process has updated the log blob 620 in the time between the read and the update. In this case, the server machine 305 rereads the log blob 620 and retries the update to the metadata storage structure 325.

If the generation number 615 has not changed since the server machine 305 originally read the log blob 620, then the server machine 305 updates the metadata storage structure 325. In this manner, the generation number 615 can prevent different server machines 305 or other processes from performing conflicting updates on the same mailbox.

As an alternative to the generation number scheme described above, and to eliminate the write transaction that updates it, the server machines 305 can update the metadata storage structure 325 with an updated log blob 620 using an enhanced update transaction that updates log blob 620 to a new value if the current value is still what the server machine 305 originally read. This alternative approach may involve moving more data per-transaction in exchange for managing one less parameter, but this tradeoff may be favorable in some circumstances.

Yet another alternative combines aspects of the generation-number approach and the enhanced-update-transaction approach. This alternative can pre-pend or append the generation number 615 to the beginning or end of the log blob 620. During the update, the server machine 305 can reference this generation number 615 to be sure that a set of updates that produced identical-looking intermediate results would be properly serialized.

When a log blob 620 for a given mailbox is updated, the server machine 305 can delete any stale entries in the metadata 320 for that mailbox before rewriting the log blob 620. Stale entries might include, for example, entries that correspond to time-bounded messages 115 that are older than the applicable retention period. If there are no more message bodies 310 in the mailbox, then the generation number 615 is incremented and the log blob 620 is deleted. One way to delete the log blob 620 is to write it as a zero-length file.

Non-empty log blob 620 can have a minimum size that is large enough that only a small percentage of mailboxes may need more than this size. If a sufficient number of contiguous pages are allocated in the table 605 for the log blob 620, the log blob 620 need not be re-allocated as it grows or shrinks. For example, assume that in a given implementation, eight (8) messages arrive in each mailbox per day. If the metadata 320 for a given time-bounded message 115 is about 500 bytes, and the retention period is 5 days, then the mean used portion of a log blob 565 would be about 20K. Thus, a 64K minimum blob size should result in almost all log blobs 620 never needing to grow. This approach may use more space overall than other solutions, but the total space used would still be relatively small. The mean number of mailboxes per storage machine 315 is about 100,000, so allocating 64K/mailbox would result in 6.4 G in storage per storage machine 315 supporting log blobs 620.

If a given mailbox has no activity at all (neither message arrivals, nor accesses by the owner) then its log blob 620 can last indefinitely, even though it would only describe expired message bodies 310. In some embodiments of the management and storage system 125, a daemon can traverse the mailboxes and remove any metadata 320 relating to expired message bodies 310. However, if the management and storage system 125 completely removes inactive mail accounts after some period of time, this type of daemon processing may not be worthwhile.

Figure 7:
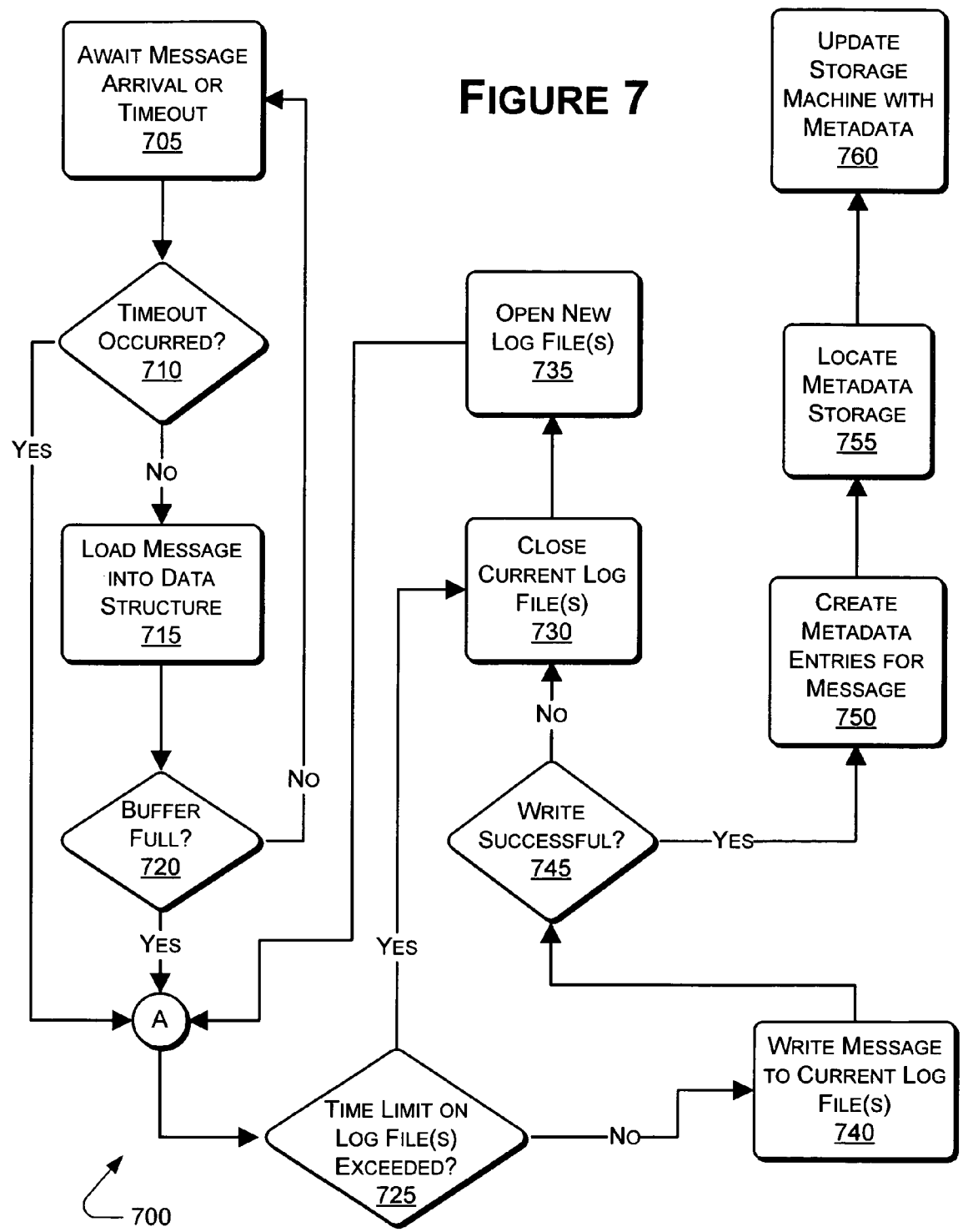
FIG. 7 is a flowchart illustrating a process flow performed to receive and deliver time-bounded messages.

FIG. 7 illustrates a process 700 performed to receive and store time-bounded messages 115. In block 705, the process 700 awaits either the arrival of a given time-bounded message 115 or expiration of a timeout parameter associated with the data structure 405 (which may take the form of a buffer) occurs. For example, given time-bounded messages 115 may be received by the management and storage system 125 and routed to a server machine 305. When either of these events occur, the process 700 proceeds to block 710, where it determines whether the time-out parameter associated with the data structure 405 has expired. If the time-out parameter has not expired, the process 700 loads the time-bounded message 115 into the data structure 405, represented by block 715. Afterwards, the process 700 passes to block 720 to evaluate whether the data structure 405 is full. If the data structure 405 is not yet full, the process 700 returns to block 705 to await the next event, which can be either a timeout condition or the arrival of the next time-bounded message 115. From block 720, if the data structure 405 is full, the process 700 proceeds to block 725. FIG. 7 includes on-page reference A for convenience and clarity in representing the process 700. However, the inclusion of on-page reference A in no way limits the teachings herein.

Returning to block 710, if the time-out parameter has expired, then the process 700 proceeds to block 725. Once again, the inclusion of on-page reference A in no way limits the teachings herein. In block 725, the process 700 determines whether the time limit for writing to the current log file(s) 415 has been exceeded. As discussed in more detail elsewhere herein, a given log file 415 can be written to for a limited period of time. If the time limit for the current log file(s) 415 has been exceeded, the process 700 proceeds to block 730 to close the current log file(s) 415. The process 700 then proceeds to block 735 to open new log file(s) 415. Afterwards, the process 700 returns to decision block 725.

From block 725, if the time limit on the current log file(s) 415 has not been exceeded, the process 700 proceeds to block 740, where the contents of the data structure 405 (i.e., the bodies of the various time-bounded messages 115) are written to one or more log files. To facilitate subsequent processing of the metadata 320 related to the time-bounded messages 115, each message 115 is timestamped. This timestamping can occur when the message 115 is loaded into the data structure 405, or when the contents of the data structure 405 are written to the log file(s) 415.

Block 745 then tests whether this write to the log file(s) 415 was successful. Assuming that the messages 115 are written to two or more log files 415 for redundancy, if a write to any log file 415 fails, then the process 700 proceeds to block 730 to close each of the current log file(s) 415. The process 700 then proceeds to block 735 to open one or more new log file(s) 415. Afterwards, the process 700 passes to decision block 725 to test whether time limit for writing to the current log file(s) 415 has been exceeded. Since the current log file(s) 415 were just created, the process 700 will pass to block 740 to re-try the write operation.

In some embodiments, the process 700 can open the new log file(s) 415 on storage machines 315 other than the machine storage 315 hosting the log file 415 to which the previous write failed. This aspect of the process 700 may result in messages 115 being written to one log file 415 of a log file set 415, but not to the other log file(s) 415. However, since the composite write to the log file set 415 failed, no metadata 320 references the non-replicated portion of the log file 415, and the non-replicated portion of the log file 415 is therefore not accessed in the future. Since the log files 415 are closed and not written-to again when a write to either half of the log file set 415 fails, and the ends of the log files 415 may be different. However, because no metadata 320 references these different ends of the log files 415, and these different ends are not accessed in the future, the fact that the ends of these files may be different is of no consequence.

The log files 415 can use Globally Unique Identifier (GUID) names, with both portions of a log file set 415 having the same name. GUIDs allow the server machine 305 to create names for log files 415 that do not conflict without having to coordinate with other components of the management and storage system 125.

Time-bounded messages 115 can be assigned to log files 415 on the storage machines 315 based on the low-order bits of the times at which the messages 115 arrive. As a consequence to this approach to assigning the messages 115 to log files 415 on the storage machines 315, messages 115 for particular mailboxes may be distributed to different storage machines 315. This means that uneven mailbox sizes and loads are unlikely to cause load hotspots or overloads in the management and storage system 125. The biasing of a round robin algorithm based on the free space available on the various storage machines 315 can further reduce the probability of storage hotspots or overloads in the management and storage system 125.

From decision block 745, if the write is successful, the process 700 proceeds to block 750 to create the metadata 320 corresponding to the stored messages 115. The various messages 115 written to the log files 415 may be addressed to a variety of different users and may thus be associated with a variety of different mailboxes. As a corollary, each user's mailbox may include respective messages that are stored in a variety of log files 415 stored on a variety of different storage machines. The metadata 320 enables subsequent location and collection of these various messages 115 for each mailbox. Thus, each user's mailbox is typically associated with a metadata storage structure 325. In block 755, the process 700 traverses each message 115 written to the current log file(s) 415, identifies the mailbox to which each message 115 is addressed, and locates the metadata storage structure 325 hosting the metadata 320 for each such mailbox. In block 760, the process 700 updates the entry in the metadata storage structure 325 for each such mailbox with the metadata 320 created in block 745.

Assuming that the process 700 is practiced with the database table embodiment 500 shown in FIG. 5, the process 700 can create an entry for the metadata 320 created for a new message body 310 by adding a new row 510 to the latest generation table describing the new message body 310.

Assuming that the process 700 is practiced with the log blob embodiment 600 shown in FIG. 6, the process 700 can read the blob image 620 and the generation number 615, purge any expired entries from the blob image 620, add the entry for the new message body 310 to the blob image 620, and start a transaction to the metadata storage structure 325 to update the blob image 620 and the generation number 615 if the generation number 615 hasn't changed. If the generation number 615 has changed, the process 700 restarts at the point where it read from the metadata storage structure 325.

Figure 8:
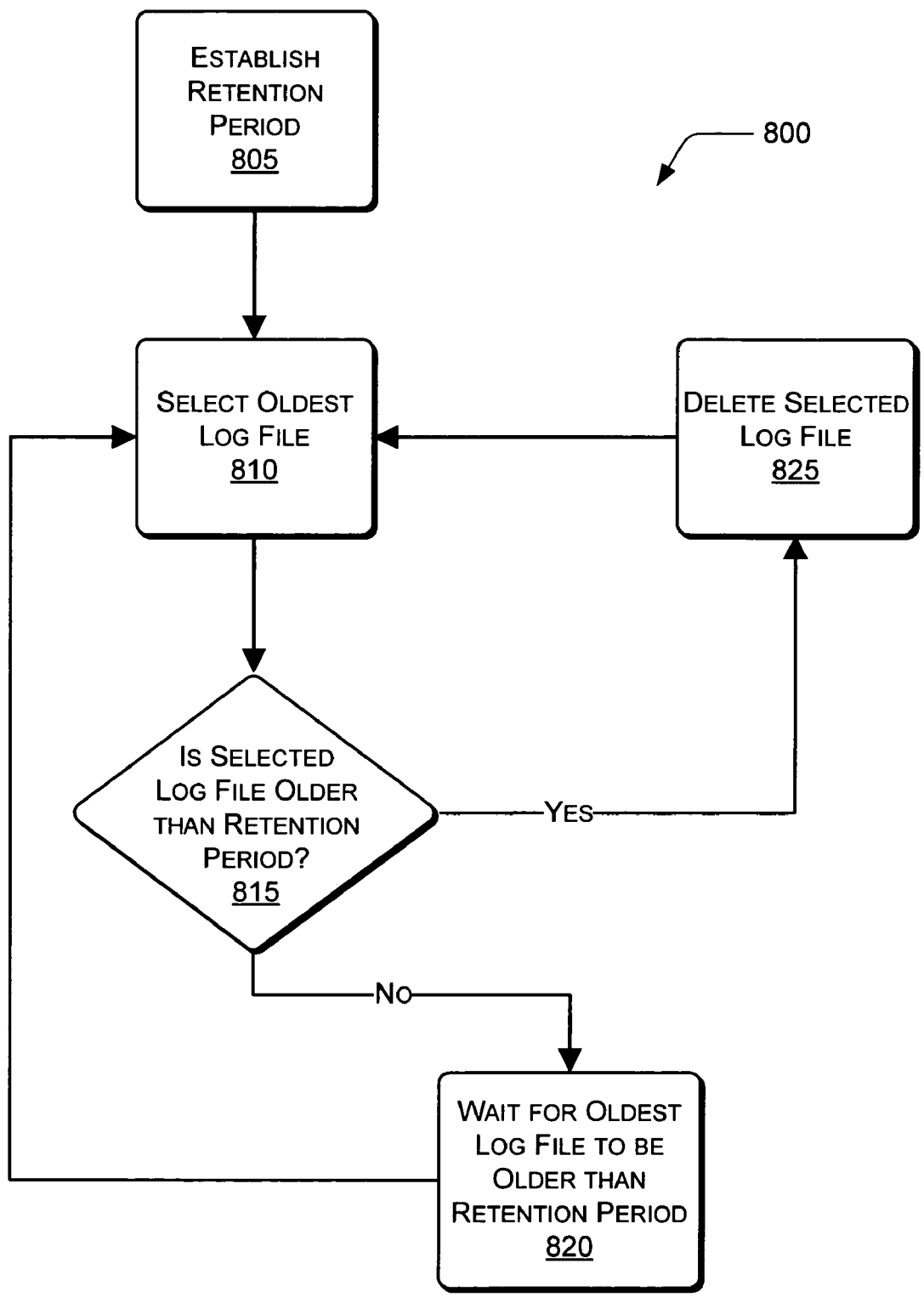
FIG. 8 is a flowchart illustrating a process flow for administering one or more log files to which message bodies are written.

FIG. 8 illustrates a process flow 800 for monitoring status of one or more log files 415 to which message bodies 310 are being written. In block 805, the retention period parameter as discussed herein is established. In the above e-mail spam example, the retention period for spam could be set for five days. In the above enterprise e-mail management example, the retention period for "sent" messages could be set for thirty days. In block 810, the process 800 selects the oldest one of the log files 415 to which message bodies 310 are written. For example, the process 800 can access a write timestamp associated with the log file(s) 415. If, for some reason, the write timestamp is unavailable or inaccessible, the time at which the last message body 310 was written to the log file 415 can determine the age of the log file 415, assuming that the message bodies 310 are written to the log file 415 in order of arrival. In block 815, the process 800 determines whether the log file 415 is older than the retention period. If the log file 415 is not older than the retention period, the process 800 proceeds to block 820, where the process 800 waits for one of the log files 415 to become older than the applicable retention period. Once this event occurs, the process 800 returns to block 810, where this given log file 415 is selected as the oldest current log file 415. The process 800 then proceeds to block 815, which was discussed before. If the selected log file 415 is older than the retention period, then the process 800 passes to block 825, where the selected log file 415 is deleted.

The process 800 shown in FIG. 8 can run as a daemon alongside the process 700 shown in FIG. 7, or alongside other processes taught herein. Alternatively, the process 800 can be integrated into the process 700, or other processes taught herein. The process 800 is shown separately in FIG. 8 for convenience of illustration and discussion only, and does not limit the applicability of the teachings herein.

Figure 9:
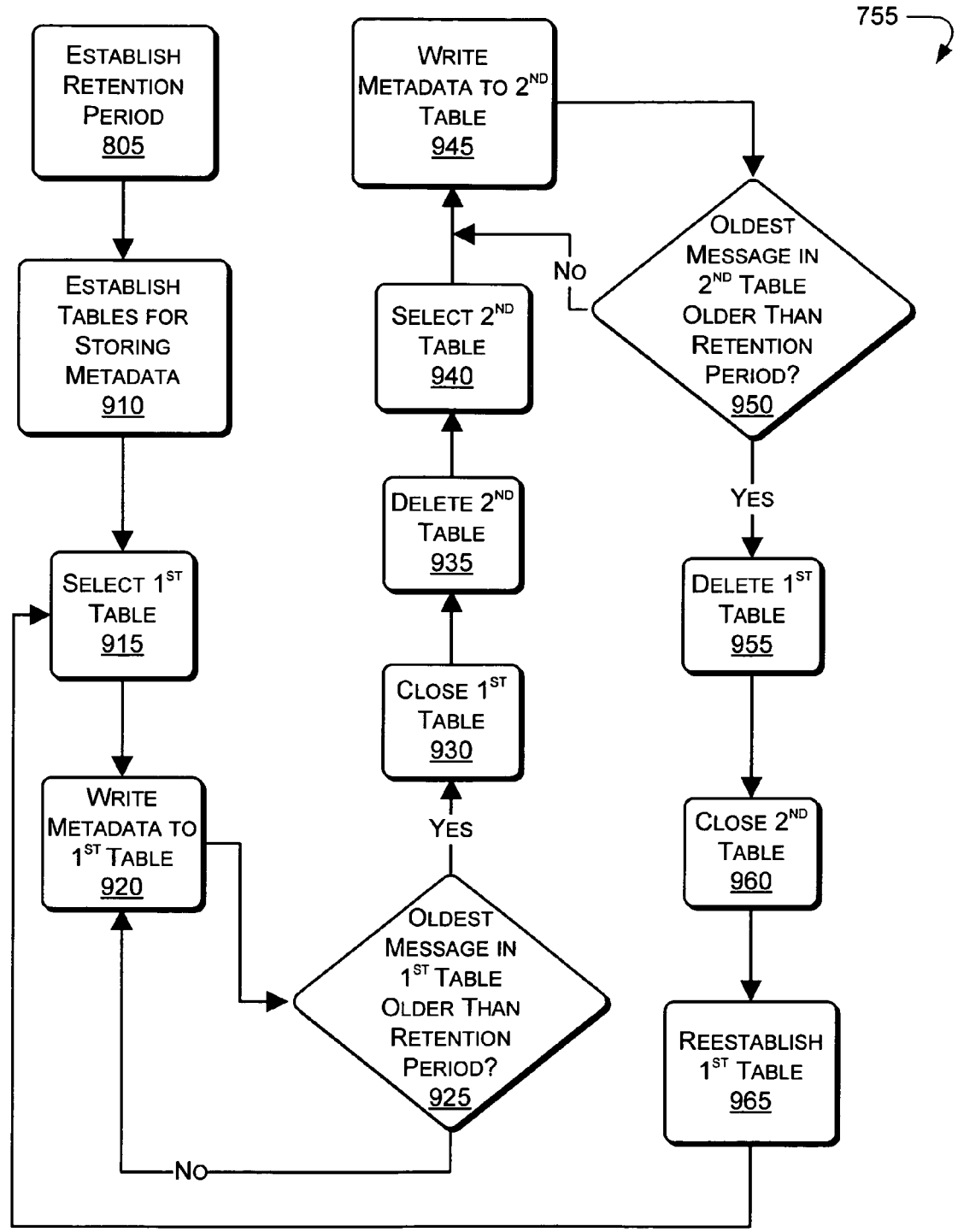
FIG. 9 is a flowchart illustrating a process for storing metadata corresponding to the time-bounded messages.

FIG. 9 illustrates in more detail the process 755 for updating the metadata 320 corresponding to the time-bounded message 115. In block 805, the process 900 establishes the retention period parameter, as discussed above in connection with FIG. 8. If the retention period parameter is already established, then block 805 need not reestablish it. In this case, the process 900 may refer to the preexisting retention period parameter.

In block 910, the process 900 creates at least two tables to which the metadata 320 will be written in various stages of the process 900, as discussed further below. In block 915, the process 900 selects a first one of the tables, created in block 910, to which to write the metadata 320 for the message bodies 310 stored in the log files 415. In block 920, the process 900 writes the metadata 320 to the table selected in block 915.

In block 925, the process 900 tests whether the oldest message body 310 in the first table is older than the retention period applicable to the message bodies 310. If not, the process 900 loops back to block 920 to continue writing the metadata 320 to the selected table, and returns to decision block 925. However, when the oldest message body 310 in the first table is older than the retention period, the process 900 proceeds to block 930, where it closes the first table. In block 935, the process 900 deletes the second table, and then proceeds to block 940, where the process 900 selects the second table created in block 910 for writing. In block 945, the process 900 writes the metadata 320 to this second table.

In block 950, the process 900 tests whether another instance of the retention period has expired. If not, the process 900 loops back to block 945 to continue writing the metadata 320 to the second table, and returns to decision block 950. When the next instance of the retention period expires, the process 900 proceeds to block 955, where it deletes the first table to which the metadata 320 was written. In block 960, the process 900 closes the second table for writing, and in block 965, the process 900 recreates the first table. The process 900 then returns to block 915 to repeat the process with the first table.

Figure 10:
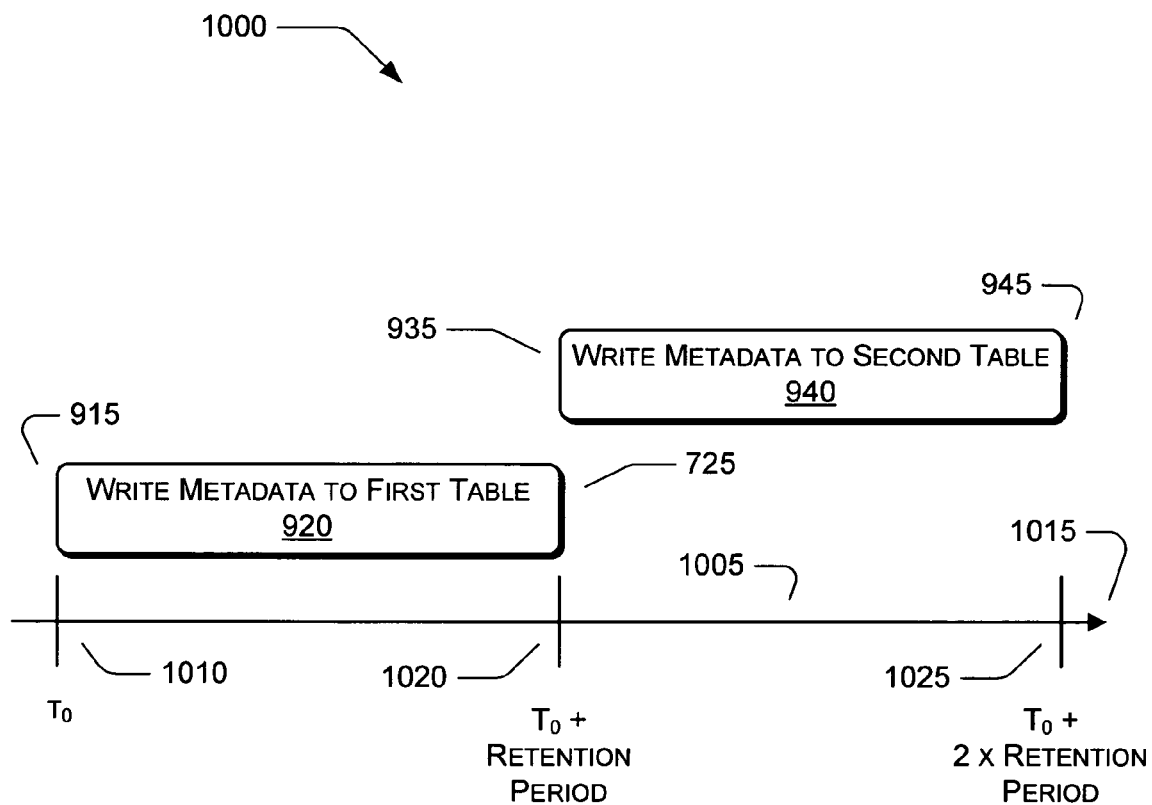
FIG. 10 is a sequence diagram of the process shown in FIG. 9.

FIG. 10 presents a sequence diagram 1000 of the process 900 shown in FIG. 9. Timeline 1005 begins at time $t_0$, indicated by line 1010, and proceeds indefinitely along the horizontal time axis as indicated generally by the arrow 1015. Line 1020 represents a time at which a first retention period expires, assuming that the retention period began running at time $t_0$. Between the times represented by the lines 1010 and 1020, the process 900 from FIG. 9 writes to the first table, as represented by block 920. Generally at or before time $t_0$, the first table is selected, as indicated by the reference numeral 915.

Generally at or shortly after the expiration of the first retention period, indicated by the vertical line 1020, the process 900 takes the "Yes" branch from block 925, stops writing to the first table, and begins writing metadata 320 to the second table, as indicated by the reference sign 935 appearing in FIG. 10. At the time marked by the line 1020, a second instance of the retention period begins, and runs until the time marked by the vertical line 1025.

Between the times marked by the lines 1020 and 1025, the process 900 writes metadata 320 to the second table, as indicated by the reference sign 940. When the second instance of the retention period expires, the process 900 stops writing to the second table, which corresponds to the "Yes" branch from block 945 in FIG. 7. Thus, the reference sign 945 appears at or near the end of block 940 as it appears in FIG. 10.

When the process 900 reaches the time marked by the line 1025, the process 900 recognizes that any metadata 320 written to the first table (block 920) is now too old to retain, because the entire second instance of the retention period has now expired. Because the entire first table now contains metadata 320 whose corresponding log files 415 have expired, the first table can now be deleted. Before the time marked by the line 1025, some of the metadata 320 written to the first table (block 920) may still be active, in that the retention period has not yet run for this metadata 320. Accordingly until the time marked by the line 1025, the metadata 320 in the first table is kept accessible in case any requests for this metadata 320 arrive.

As illustrated in FIGS. 9 and 10, the process 900 can write the metadata 320 alternately to two tables, with each table in turn being written-to, closed after one retention period, and deleted after a second retention period. For clarity and conciseness, FIGS. 9 and 10 illustrate one iteration of this process 900. However, it is noted that this process 900 can be repeated indefinitely, with each of the two tables being written-to and deleted in turn. It is also noted that the process 900 can be practiced with more than two tables, and that the two-table embodiment illustrated and discussed herein is shown for convenience only. In general, the process 900 can create N tables, where N is an integer that is one greater than the message retention period divided by the time period over which a table may be written.

Figure 11:
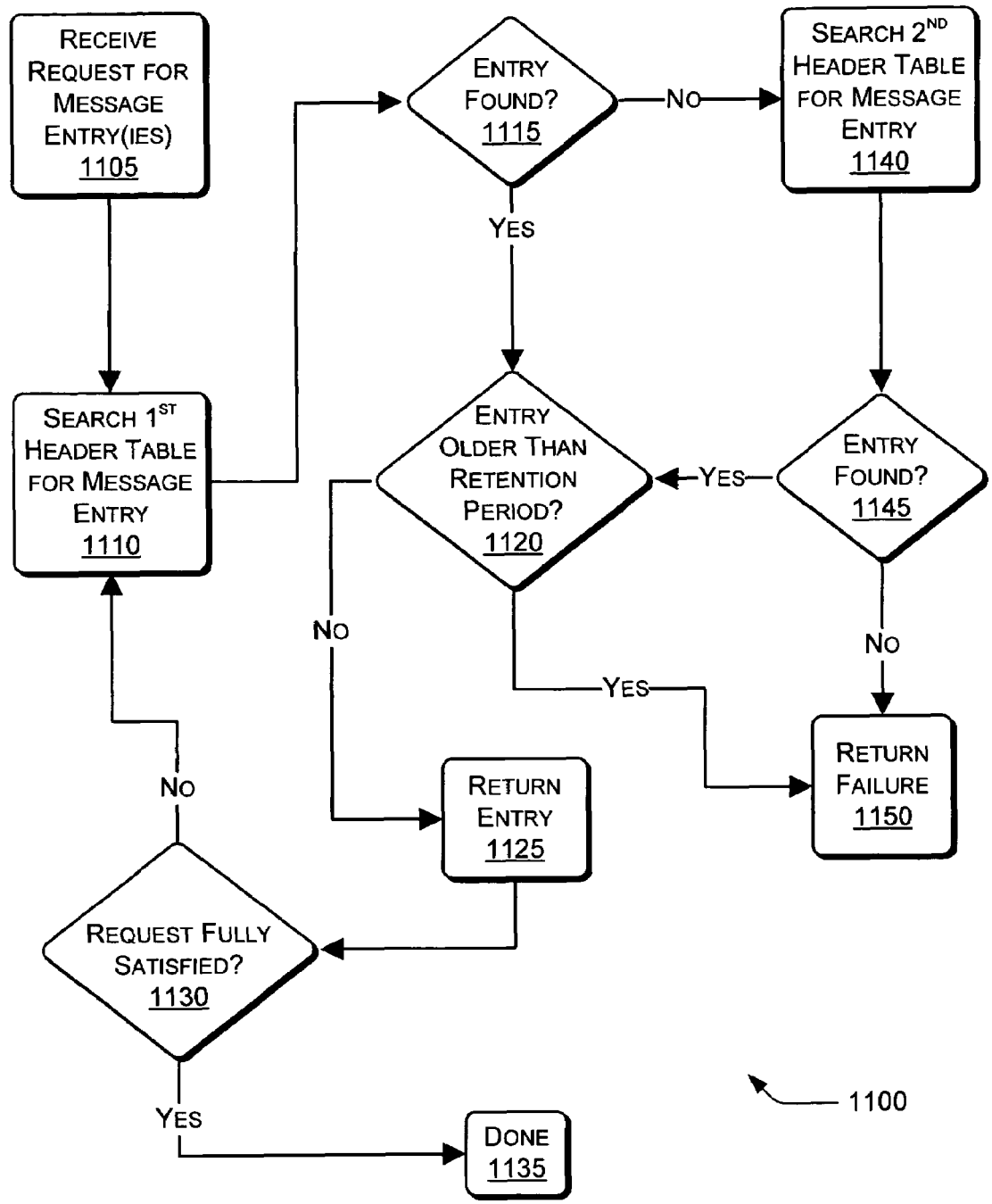
FIG. 11 is a flowchart illustrating a process for traversing a table structure to search for requested metadata or header information.

FIG. 11 illustrates a process 1100 for traversing a table structure to search for requested metadata 320 or header information. In block 1105, the process 1100 receives a request for given message header information. In the examples discussed above, this request may be for a given e-mail that takes the form of a spam message or a "sent" message that is subject to a retention period. For example, the user may request that a given message be retrieved, or may request that some or all messages associated with a given mailbox be retrieved. The process 1100 may be suitable for honoring that request or determining whether that request can be honored at all.

In block 1110, the process 1100 searches a first header structure, which may take the form of a table, to locate the metadata 320 for any messages responsive to the request received in block 1105. In block 1115, the process 1100 determines whether any entries responsive to the request were fond in the first header table. If an entry in the header table was found that was responsive to the request, the process 1100 proceeds to block 1120. In block 1120, the process 1100 refers to the timestamp associated with the entry and determines whether the entry was made more than one "retention period" ago. For example, if the retention period for the entry is 30 days, block 1120 determines whether the given entry is more than 30 days old. Recall that the message bodies 310 and related metadata 320 were timestamped during the process 700 shown in FIG. 7 when they were stored in the log files 415 and/or metadata storage structure 325.

If the given entry is not older than the retention period, the process 1100 proceeds to block 1125, where the process 1100 returns this entry in response to the request received in block 1105. The process 1100 then proceeds to block 1130, where process 1100 determines whether the request received in block 1105 has been fully satisfied. For example, if the request received in block 1105 is for a single message, and that single message was located and returned in block 1125, then the process 1100 has completely satisfied the request. In this case, the process 1100 proceeds to block 1135 and completes. However, if the request was to retrieve multiple messages, or to retrieve some or all of a given mailbox, the process 1100 may search for and retrieve more messages. In this case, the process 1100 proceeds to block 1110 to search for these entries.

Returning to block 1115, if the requested entry is not found in the first header table, the process 1100 proceeds to block 1140, where it searches the second header table for the header information that was requested in block 1105. In block 1145, the process 1100 determines whether the requested header information was found in the second header table. If the requested header information was found, the process 1100 proceeds to block 1120 to test whether the located header information is older than the applicable retention period. If the located header information is older than the applicable retention period, then the process 1100 proceeds to block 1150, where a failure is reported. Returning to block 1145, if the requested header information was not found, then the process 1100 proceeds to block 1150 to report failure, since the requested header information was not found in either the first or the second header tables.

Assuming that the process 1100 is practiced with the table implementation 500 shown in FIG. 5, the process 1100 can do a query joining all of the generational tables 505, getting all rows 510 corresponding to messages in the given mailbox, excluding any messages that are beyond the applicable retention period. Assuming that the process 1100 is practiced with the log blob implementation 600 shown in FIG. 6, the process 1100 can read the log blob image 620 for the given mailbox, ignore any messages older than the applicable retention period, and return the remainder.

Figure 12:
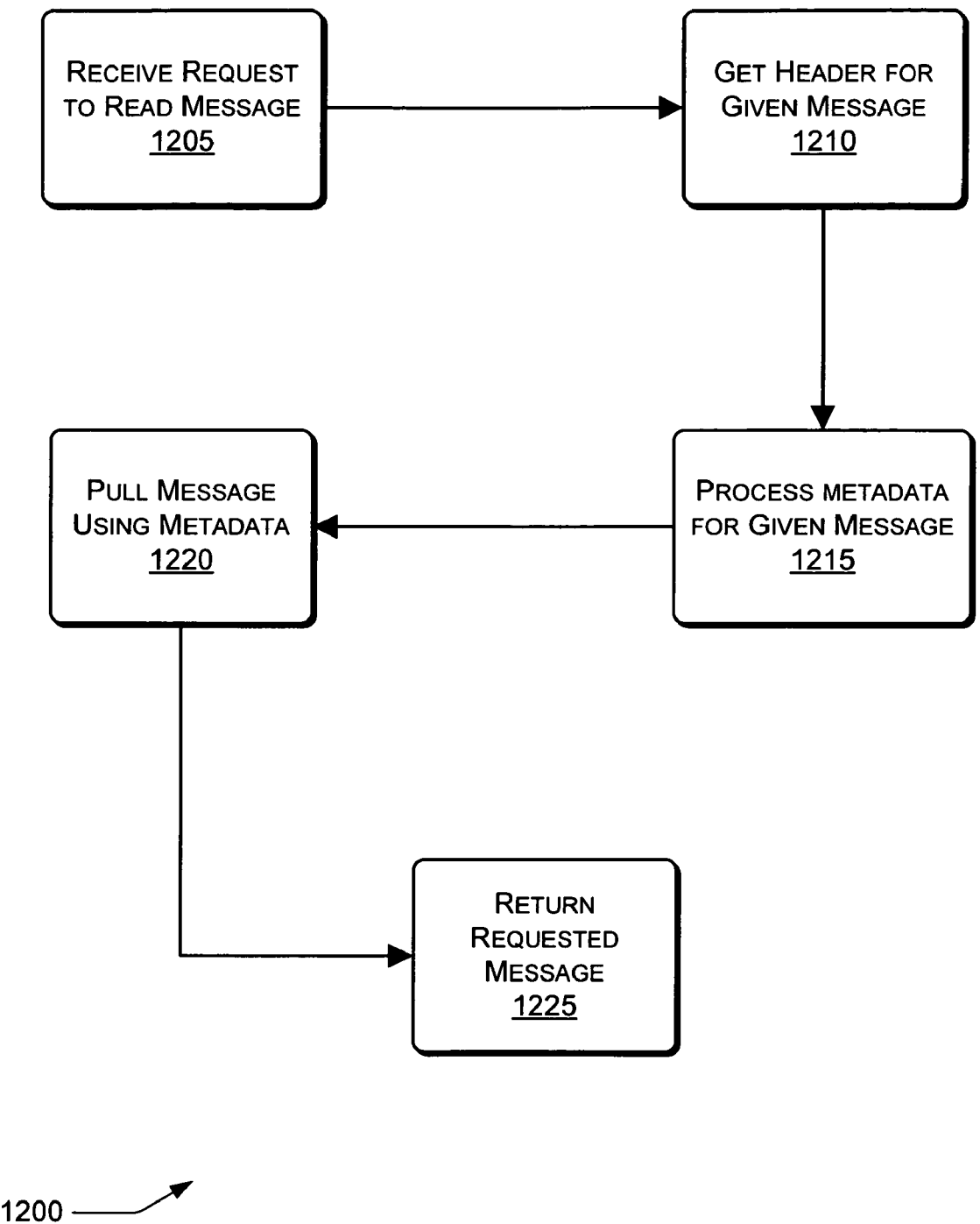
FIG. 12 is a flowchart illustrating a process for retrieving a given message upon request so it can be presented to a user.

FIG. 12 illustrates a process 1200 for retrieving a given message upon request so it can be presented to a user. In block 1205, the process 1200 receives a request to present the given message to a user. In block 1210, the process 1200 finds the header containing the metadata 320 for the given message in a manner similar to the process 1100 described above in FIG. 11 for reading the message headers. In block 1215, the process 1200 processes the metadata 320 pulled from the headers to find the name of the log file 415 containing the given message, the storage machine 315 containing the log file 415, the offset of the message in the log file 415, and the length of the message.

In block 1220, assuming that the given message is stored in a log file set 415, the process 1200 selects one log file 415 from the log file set 415, and attempts to read the requested message from the selected log file 415. If the read does not complete sufficiently quickly and/or successfully, the process 1200 can attempt to read the requested message from the second log file 415 in the log file set 415. In block 1225, when the requested message is read successfully, the process 1200 returns the requested message.

Figure 13:
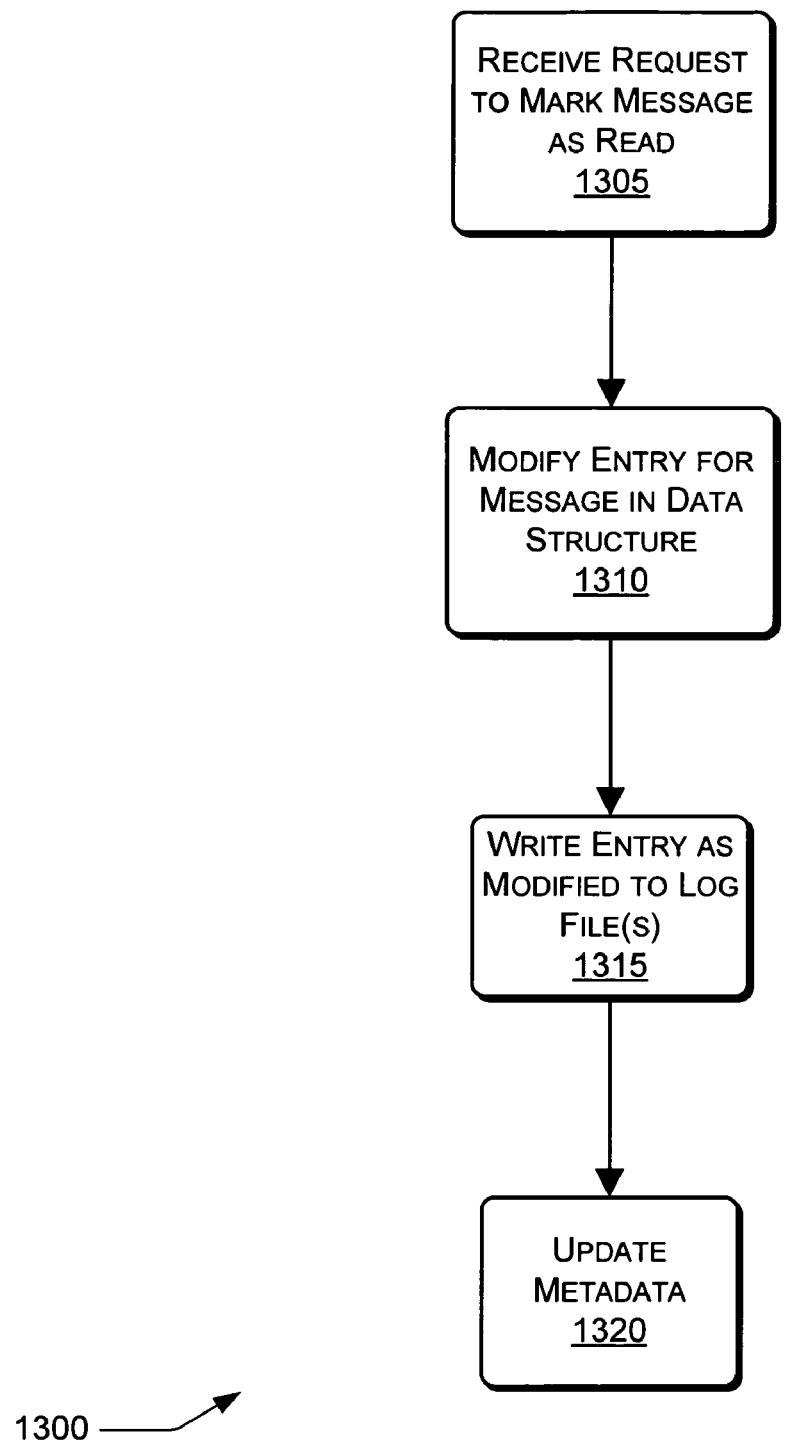
FIG. 13 is a flowchart illustrating a process for marking a given message as read.

FIG. 13 illustrates a process 1300 for marking a given message as read. In block 1305, the process 1300 receives a request to mark the given message as read. In block 1310, the process 1300 modifies an entry in a data structure corresponding to the given message to indicate that the message should be marked as having been read. This modification can include writing an indicator to a special log record indicating that the given message has been read.

In block 1315, the process 1300 writes the given message to a log file(s) 415, most likely along with a plurality of other messages. The process 1300 can wait until the write of the data structure entries is committed to a log file(s) 415 in the same way as with a message delivery. This record in the log file 415 is only needed in the case that the database is lost and is to be recreated from the log files 415. In block 1320, once the write to the log file(s) 415 is finished, the process 1300 updates the metadata 320 in the metadata storage structure 325 in a manner similar to the delivery of a new message.

The processes 1200 and 1300 can run, for example on a server machine 305. To mark a given message as deleted, the server machine 305 can perform a process similar to the process 1300 to mark a given message as read, including writing the special log record to the log file 415. In the log blob embodiment 600, it may be advisable to delete the log blob 620 entirely when deleting the given message empties the mailbox in which that message formerly resided.

To mark all messages in a given mailbox as deleted, the server machine 305 can make an entry in the data structure 405, similarly to the process 1300 performed above. In the log blob embodiment 600, the server machine 305 can do a single database transaction to delete the log blob 620 entirely, and so can skip the read portion of the update.

In the event that the metadata storage structure 325 crashes or becomes inaccessible or unavailable, the data for reconstructing the metadata storage structure 325 is available in the log files 415. However, the log files 415 for any particular metadata storage structure 325 may be distributed over a plurality of log files 415 in a given cluster 210. One approach to rebuilding the metadata storage structure 325 is to read all the log files 415 in the cluster 210. If this task is assigned exclusively to a single machine, the time to do this task may be limited by the time to move all the log files 415 over the network interface of the machine doing the reconstruction. In particular implantations, this approach may or may not be attractive or feasible.

Another approach is based on the observation that only about 1% of the messages being read actually affect the metadata storage structure 325 being reconstructed, since there are typically 100 storage machines per cluster with equal-sized metadata storage structure 325. Furthermore, only the metadata 320 is of interest to the reconstruction, not the message bodies 310, which further reduces the data volume that must be processed in the reconstruction.

Finally, should the metadata storage structure 325 or one or more of the storage machines 315 fail, the contents of these components may be archived or backed-up on a periodic basis according to predefined procedures. In such cases, some or perhaps most of the contents of the metadata storage structure 325 or the storage machines 315 may be recoverable from the latest archive or back-up file, with only those contents that missed the latest back-up having to be recovered according to one of the above approaches.

Figure 14:
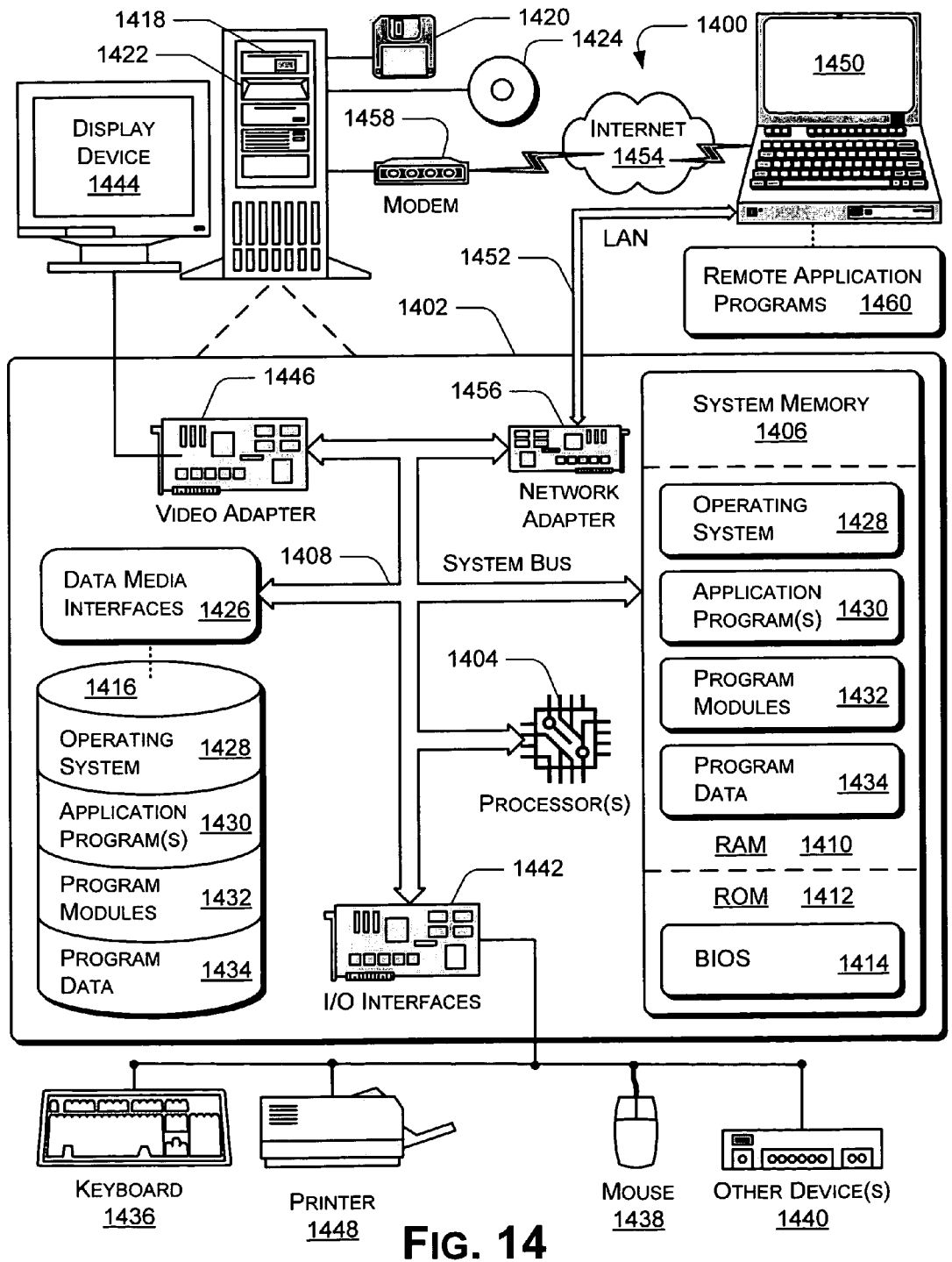
FIG. 14 is a block diagram illustrating a computing environment within which systems and methods for efficient processing of time-bounded messages, as well as the computing, network, and system architectures described herein, can be either fully or partially implemented.

FIG. 14 illustrates a computing environment 1400 for efficiently processing time-bounded messages, and for fully or partially implementing the computing, network, and system architectures described herein. More particularly, the computing environment 1400 may be suitable for implementing various components described herein, including but not limited to the message classifiers 110, the management systems 125 and 130, the front ends 205, the server machines 305, the storage machines 315, and the metadata storage structures 325.

Exemplary computing environment 1400 is only one example of a computing system and is not intended to suggest any limitation as to the scope of use or functionality of the architectures. Neither should the computing environment 1400 be interpreted as having any dependency or requirement relating to any one or combination of components illustrated in the exemplary computing environment 1400.

The computer and network architectures in computing environment 1400 can be implemented with numerous other general purpose or special purpose computing system environments or configurations. Examples of well known computing systems, environments, and/or configurations that may be suitable for use include, but are not limited to, personal computers, server computers, client devices, hand-held or laptop devices, microprocessor-based systems, multiprocessor systems, set top boxes, programmable consumer electronics, network PCs, minicomputers, mainframe computers, gaming consoles, distributed computing environments that include any of the above systems or devices, and the like.

The computing environment 1400 includes a general-purpose computing system in the form of a computing device 1402. The components of computing device 1402 can include, but are not limited to, one or more processors 1404 (e.g., any of microprocessors, controllers, and the like), a system memory 1406, and a system bus 1408 that couples the various system components. The one or more processors 1404 process various computer executable instructions to control the operation of computing device 1402 and to communicate with other electronic and computing devices. The system bus 1408 represents any number of several types of bus structures, including a memory bus or memory controller, a peripheral bus, an accelerated graphics port, and a processor or local bus using any of a variety of bus architectures.

Computing environment 1400 includes a variety of computer readable media which can be any media that is accessible by computing device 1402 and includes both volatile and non-volatile media, removable and non-removable media. The system memory 1406 includes computer readable media in the form of volatile memory, such as random access memory (RAM) 1410, and/or non-volatile memory, such as read only memory (ROM) 1412. A basic input/output system (BIOS) 1414 maintains the basic routines that facilitate information transfer between components within computing device 1402, such as during start-up, and is stored in ROM 1412. RAM 1410 typically contains data and/or program modules that are immediately accessible to and/or presently operated on by one or more of the processors 1404.

Computing device 1402 may include other removable/non-removable, volatile/non-volatile computer storage media. By way of example, a hard disk drive 1416 reads from and writes to a non-removable, non-volatile magnetic media (not shown), a magnetic disk drive 1418 reads from and writes to a removable, non-volatile magnetic disk 1420 (e.g., a "floppy disk"), and an optical disk drive 1422 reads from and/or writes to a removable, non-volatile optical disk 1424 such as a CD-ROM, digital versatile disk (DVD), or any other type of optical media. In this example, the hard disk drive 1416, magnetic disk drive 1418, and optical disk drive 1422 are each connected to the system bus 1408 by one or more data media interfaces 1426. The disk drives and associated computer readable media provide non-volatile storage of computer readable instructions, data structures, program modules, and other data for computing device 1402.

Any number of program modules can be stored on RAM 1410, ROM 1412, hard disk 1416, magnetic disk 1420, and/or optical disk 1424, including by way of example, an operating system 1428, one or more application programs 1430, other program modules 1432, and program data 1434. Each of such operating system 1428, application program(s) 1430, other program modules 1432, program data 1434, or any combination thereof, may include one or more embodiments of the systems and methods described herein.

Computing device 1402 can include a variety of computer readable media identified as communication media. Communication media typically embodies computer readable instructions, data structures, or program modules. By way of example and not limitation, communication media includes wired media such as a wired network or direct-wired connection, and wireless media such as acoustic, RF, infrared, other wireless media, and/or any combination thereof.

A user can interface with computing device 1402 via any number of different input devices such as a keyboard 1436 and pointing device 1438 (e.g., a "mouse"). Other input devices 1440 (not shown specifically) may include a microphone, joystick, game pad, controller, satellite dish, serial port, scanner, and/or the like. These and other input devices are connected to the processors 1404 via input/output interfaces 1442 that are coupled to the system bus 1408, but may be connected by other interface and bus structures, such as a parallel port, game port, and/or a universal serial bus (USB).

A display device 1444 (or other type of monitor) can be connected to the system bus 1408 via an interface, such as a video adapter 1446. In addition to the display device 1444, other output peripheral devices can include components such as speakers (not shown) and a printer 1448 which can be connected to computing device 1402 via the input/output interfaces 1442.

Computing device 1402 can operate in a networked environment using logical connections to one or more remote computers, such as remote computing device 1450. By way of example, remote computing device 1450 can be a personal computer, portable computer, a server, a router, a network computer, a peer device or other common network node, and the like. The remote computing device 1450 is illustrated as a portable computer that can include any number and combination of the different components, elements, and features described herein relative to computing device 1402.

Logical connections between computing device 1402 and the remote computing device 1450 are depicted as a local area network (LAN) 1452 and a general wide area network (WAN) 1454. Such networking environments are commonplace in offices, enterprise-wide computer networks, intranets, and the Internet. When implemented in a LAN networking environment, the computing device 1402 is connected to a local network 1452 via a network interface or adapter 1456. When implemented in a WAN networking environment, the computing device 1402 typically includes a modem 1458 or other means for establishing communications over the wide area network 1454. The modem 1458 can be internal or external to computing device 1402, and can be connected to the system bus 1408 via the input/output interfaces 1442 or other appropriate mechanisms. The illustrated network connections are merely exemplary and other means of establishing communication link(s) between the computing devices 1402 and 550 can be utilized.

In a networked environment, such as that illustrated with computing environment 1400, program modules depicted relative to the computing device 1402, or portions thereof, may be stored in a remote memory storage device. By way of example, remote application programs 1460 are maintained with a memory device of remote computing device 1450. For purposes of illustration, application programs and other executable program components, such as operating system 1428, are illustrated herein as discrete blocks, although it is recognized that such programs and components reside at various times in different storage components of the computing device 1402, and are executed by the one or more processors 1404 of the computing device 1402.

Although embodiments for efficiently processing of time-bounded messages have been described in language specific to structural features and/or methods, it is to be understood that the subject of the appended claims is not necessarily limited to the specific features or methods described. Rather, the specific features and methods are disclosed as exemplary implementations of efficiently processing of time-bounded messages.

The invention claimed is:

1. A method, comprising:
classifying a plurality of messages as one of time-bounded messages and non-time-bounded messages;
processing the time-bounded messages separately from the non-time-bounded messages, wherein the processing includes:
accumulating a plurality of message bodies associated with the time-bounded messages in a data structure residing on a server machine,
writing the accumulated plurality of message bodies in bulk to one or more common storage entities stored on a first storage structure at the occurrence of a trigger event, the data structure separate from the first storage structure,
compiling metadata related to the message bodies, and storing the metadata in a second storage structure that is separate from the first storage structure; and
optimizing processing of the message bodies separately from processing of the metadata, the optimizing processing of the message bodies including accumulating a plurality of the message bodies in a common storage entity, the plurality of the message bodies in the common storage entity being subject to a common retention period parameter that indicates when to delete the plurality of the message bodies.

2. The method of claim 1, wherein the common storage entity is a log file, the log file storing the plurality of the message bodies.

3. The method of claim 2, wherein writing the accumulated plurality of message bodies in bulk comprises writing the accumulated plurality of message bodies in bulk to the one or more common storage entities when a size of the data structure reaches a target size.

4. The method of claim 1, wherein compiling metadata includes determining a storage machine containing a log file in which a time-bounded message corresponding to at least a portion of the metadata is stored.

5. The method of claim 1, wherein optimizing processing of the message bodies separately from processing of the metadata includes defining separate deletion algorithms applicable to the message bodies and the metadata.

6. The method of claim 5, further comprising deleting the message bodies separately from deleting the metadata.

7. The method of claim 1, wherein classifying the messages includes classifying at least some of the messages as span emails.

8. The method of claim 1, wherein classifying the messages includes classifying at least some of the messages as emails that are subject to a predefined retention policy.

9. The method of claim 2, further comprising deleting the time-bounded messages in response to expiration of the common retention period parameter applicable to the time-bounded messages.

10. The method of claim 1, further comprising reading the time-bounded messages from a data store.

11. Apparatus, comprising:
means for classifying a plurality of messages as one of time-bounded messages and non-time-bounded messages; and
means for processing the time-bounded messages separately from the non-time-bounded messages, wherein the means for processing includes means for storing a plurality of message bodies associated with the time-bounded messages in a storage structure, means for writing the stored plurality of message bodies in bulk to one or more common storage entities, means for compiling metadata related to the message bodies, and means for storing the metadata in a further storage structure that is separate from the storage structure; and
means for optimizing processing of the message bodies separately from processing of the metadata, the means for optimizing processing of the message bodies accumulating a plurality of the message bodies in a common storage entity, the plurality of the message bodies in the common storage entity being subject to a common retention period parameter that indicates when to delete the plurality of the message bodies.

12. The apparatus of claim 11, wherein the common storage entity is a log file that stores the plurality of the message bodies.

13. The apparatus of claim 12, wherein the means for writing the stored plurality of message bodies in bulk to one or more common storage entities comprises means for writing the stored plurality of message bodies in bulk to a disk drive at the occurrence of a triggering event.

14. The apparatus of claim 11, further comprising means for reading the plurality of message bodies to reconstruct the metadata related to the message bodies.

15. The apparatus of claim 11, wherein the means for classifying the messages includes means for classifying at least some of the messages as emails that are subject to a predefined retention policy.

16. One or more computer readable storage media comprising computer executable instructions that, when executed, direct a computing device to:
classify a plurality of messages as one of time-bounded messages and non-time-bounded messages; and
process the time-bounded messages separately from the non-time-bounded messages, wherein the processing includes accumulating a plurality of message bodies associated with the time-bounded messages in a first storage structure, writing the accumulated plurality of message bodies in bulk to one or more common storage entities, compiling metadata related to the message bodies, and storing the metadata in a second storage structure that is separate from the storage structure; and optimize processing of the message bodies separately from processing of the metadata, the optimizing processing of the message bodies including accumulating a plurality of the message bodies in a common storage entity, the plurality of the message bodies in the common storage entity being subject to a common retention period parameter that indicates when to delete the plurality of the message bodies.

17. One or more computer readable storage media as recited in claim 16, wherein the common storage entity is a log file that stores the plurality of the message bodies.

18. One or more computer readable storage media as recited in claim 16, further comprising instructions to define separate deletion algorithms applicable to the message bodies and the metadata.

19. One or more computer readable storage media as recited in claim 18, further comprising instructions to delete the message bodies separately from deleting the metadata.

* * * * *